United States Patent
Martin

(10) Patent No.: US 10,427,959 B2
(45) Date of Patent: Oct. 1, 2019

(54) METHOD AND SYSTEM FOR THE AUTONOMOUS SELF-LIMITING GENERATION OF CHLORINE DIOXIDE

(71) Applicant: Roy W. Martin, Downers Grove, IL (US)

(72) Inventor: Roy W. Martin, Downers Grove, IL (US)

(73) Assignee: TRUOX, INC., McClellan, CA (US)

( * ) Notice: Subject to any disclaimer, the term of this patent is extended or adjusted under 35 U.S.C. 154(b) by 69 days.

(21) Appl. No.: 15/732,243

(22) Filed: Oct. 11, 2017

(65) Prior Publication Data

US 2018/0099882 A1    Apr. 12, 2018

Related U.S. Application Data

(60) Provisional application No. 62/496,316, filed on Oct. 12, 2016.

(51) Int. Cl.

| | |
|---|---|
| *C01B 11/02* | (2006.01) |
| *C02F 1/50* | (2006.01) |
| *C02F 1/68* | (2006.01) |
| *C02F 1/76* | (2006.01) |
| *C09K 8/04* | (2006.01) |
| *C09K 8/60* | (2006.01) |
| *C09K 8/66* | (2006.01) |
| *C09K 8/84* | (2006.01) |
| *C02F 103/02* | (2006.01) |
| *C02F 103/20* | (2006.01) |
| *C02F 103/10* | (2006.01) |
| *C02F 103/42* | (2006.01) |

(52) U.S. Cl.
CPC .............. *C02F 1/50* (2013.01); *C01B 11/024* (2013.01); *C02F 1/688* (2013.01); *C02F 1/76* (2013.01); *C09K 8/04* (2013.01); *C09K 8/605* (2013.01); *C09K 8/66* (2013.01); *C09K 8/84* (2013.01); *C02F 2103/023* (2013.01); *C02F 2103/10* (2013.01); *C02F 2103/20* (2013.01); *C02F 2103/42* (2013.01); *C02F 2303/04* (2013.01)

(58) Field of Classification Search
CPC .. C01B 11/024; C02F 1/50; C02F 1/68; C02F 1/685; C02F 1/686; C02F 1/76; C02F 2103/023; C02F 2103/10; C02F 2103/20; C02F 2303/04; C09K 8/04; C09K 8/605; C09K 8/66; C09K 8/84
See application file for complete search history.

(56) References Cited

U.S. PATENT DOCUMENTS

| | | | |
|---|---|---|---|
| 2015/0060370 A1* | 3/2015 | Martin | C02F 1/76 210/739 |
| 2015/0065403 A1* | 3/2015 | Martin | C02F 1/76 507/269 |

* cited by examiner

*Primary Examiner* — Lucas A Stelling

(57) ABSTRACT

The invention relates to a method for the autonomous generation of safe self-limiting concentrations of chlorine dioxide for the treatment of process water. The method comprises a system that is self-limiting such that variations in water flow-rate and/or feed-rate of chlorite donor does not allow for increased concentrations of chlorine dioxide. The effluent concentration from the system does not exceed 3000 ppm thereby providing a means of generating chlorine dioxide for use where remote applications and/or where unskilled personnel are involved.

15 Claims, 2 Drawing Sheets

METHOD AND SYSTEM FOR THE AUTONOMOUS SELF-LIMITING GENERATION OF CHLORINE DIOXIDE

TECHNICAL FIELD

The claims recite a method for the autonomous generation of safe self-limiting concentrations of chlorine dioxide for the treatment of process water, the method comprising: a system comprising; a pressurized vessel containing a hydantoin based free halogen donor having a solubility between 0.075 to 0.30 wt % at 25° C., a source of water in fluid contact with the inlet to the pressurized vessel, a manifold in fluid contact with the outlet from the pressurized vessel for the introduction of at least a chlorite donor, a reaction chamber in fluid contact with the manifold and with the process water to be treated; wherein said source of water dissolves hydantoin based free halogen donor until 50 to 100% of saturation is achieved to form an aqueous solution of free halogen, chlorite donor is introduced to the aqueous solution of free halogen, chlorine dioxide is produced in the reaction chamber, and said chlorine dioxide in introduced to the process water. Additionally, acid can be applied to the aqueous solution prior to the reaction chamber to accelerate the formation of chlorine dioxide.

BACKGROUND

In the petroleum industry oil and gas recovery operations use significant amounts of water that can be contaminated by bacteria and in many cases endospores. Some non-limiting examples of applications that use said water include: well drilling, hydraulic fracturing, desalination for the removal of accumulated salts from down-hole artificial lift pumps; water flooding to displace more petroleum in the geologic formation toward the collection well, and power fluid used for operating jet pumps to extract formation fluids.

Many bacteria are facultative, that is they can exist in aerobic or anaerobic conditions using either molecular oxygen or other oxygen sources to support their metabolic processes. For example, under the right conditions, facultative bacteria can use sulfate as an oxygen source and respire hydrogen sulfide, which is highly toxic to humans in addition to being corrosive to steel. Additionally, in a process known in the art as Microbiologically Induced Corrosion (MIC), bacteria will attach to a substrate, such as the wall of a pipe in the wellbore, and form a "biomass" shield around them. Underneath, the bacteria metabolize the substrate (e.g. a mixture of hydrocarbon and metallic iron) and respire hydrogen sulfide, resulting in the metal becoming severely corroded in the wellbore and, eventually, pipe failure and damage to down-hole equipment. The respiration and presence of hydrogen sulfide also complicates the refining and transportation process, and attenuates the economic value of the produced hydrocarbon.

The traditional methods, when used alone to address these problems, have one or more drawbacks. For example, the present industry practice is to add conventional organic and inorganic biocides, such as quaternary ammonium compounds, chloramines, aldehydes, such as Gluteraldehyde, THPS and sodium hypochlorite, to fracturing fluids with other additives to control bacteria. The efficacy of these conventional biocides alone, however, can be minimal due to the type of bacteria that typically are found in hydrocarbon-bearing formations and petroleum production environments. More particularly, only a small percentage of these bacteria, which are often found in volcanic vents, geysers, and ancient tombs, are active at any one time; the remainder of the population is present in dormant and spore states. The aforementioned conventional biocides have no, or limited, effect on dormant and spore forming bacteria. Thus, while the active bacteria are killed to some extent, the inactive bacteria survive and thrive once they reach the environmental conditions found within the formation. Additionally, these biocides become inactivated when exposed to many of the components found in petroleum production formations. And, furthermore, microorganisms build resistance to these biocides, thus limiting their utility over time.

Chlorine dioxide, on the other hand, can inactivate active, dormant (endospores) and spore forming microorganisms at comparatively low concentrations (e.g. 10 ppm). Unlike conventional biocides, microorganisms do not build a resistance to chlorine dioxide. Chlorine dioxide is also selective compared to indiscriminate oxidizing biocides like bromine and chlorine. Chlorine dioxide is therefore an efficacious biocide however certain applications have not been possible prior to the invention. For example, producing wells often require desalination of the down-hole pumps (lift-jacks) to remove the mineral salts that accumulate and foul the pump. Producing wells are located in remote areas where the limited attention and access makes the use of chlorine dioxide unpractical and potentially dangerous.

The dangers of chlorine dioxide are well known to those skilled in the art. Chlorine dioxide vapors have caused explosions causing severe damage, injuries and even death. Referring to U.S. Pat. No. 4,013,761, Ward et al. discloses the concerns associated with chlorine dioxide vapors and its inherent danger.

In order to be able to provide wide-spread application of chlorine dioxide to treat these applications, a method and system are needed that provides for the autonomous generation of chlorine dioxide that is inherently safe, due to its self-limiting generating capacity.

In one embodiment, a method is disclosed that provides for the autonomous generation of safe self-limiting concentrations of chlorine dioxide.

In another embodiment, a method is disclosed for the autonomous generation of safe self-limiting concentrations of chlorine dioxide for the treatment of process water used in hydrocarbon recovery applications.

In another embodiment, a method is disclosed for the autonomous generation of safe self-limiting concentrations of chlorine dioxide for the treatment of process water used in an aquatic facility.

In another embodiment, a method is disclosed for the autonomous generation of safe self-limiting concentrations of chlorine dioxide for the treatment of industrial cooling water.

In yet another embodiment, a method is disclosed for the autonomous generation of safe self-limiting concentrations of chlorine dioxide for the treatment of waste water.

BRIEF DESCRIPTION OF THE INVENTION

The invention discloses a method for the autonomous generation of safe self-limiting concentrations of chlorine dioxide for the treatment of process water, the method comprising: a system comprising; a pressurized vessel containing a hydantoin based free halogen donor having a solubility between 0.075 to 0.30 wt % at 25° C., a source of water in fluid contact with the inlet to the pressurized vessel, a manifold in fluid contact with the outlet from the pressurized vessel for the introduction of at least a chlorite donor, a reaction chamber in fluid contact with the manifold and with the process water to be treated; wherein said source of water dissolves hydantoin based free halogen donor until 50 to 100% of saturation is achieved to form an aqueous solution of free halogen, chlorite donor is introduced to the manifold, chlorine dioxide is produced in the reaction chamber, and said chlorine dioxide in introduced to the process water.

The souring of a hydrocarbon recovery systems is the result of microbe contamination of the hydrocarbon recovery system and subsequent establishment of sulfate reducing bacteria. In higher temperature formations exemplified by the Bakken formation, it is likely endospores introduced by contaminated surface water establish themselves within the formation and/or piping of the hydrocarbon recovery system. Under the proper conditions, the endospores germinate to vegetative bacteria. The bacteria reduce sulfates resulting in the formation of hydrogen sulfide that reduces the value of the recovered hydrocarbons, or altogether eliminates the ability to sell the hydrocarbons.

The treatment of water used in petroleum recovery operations greatly reduces the potential for contamination from bacteria and endospores, thereby reducing or all together elimination the potential for souring of the wells.

The disclosed invention provides a cost effective and safe means to provide chlorine dioxide to remote locations or where monitoring of the chlorine dioxide generator is infrequent. The system must be reliable and safe, preventing the generation of potentially dangerous concentrations of chlorine dioxide due to variances in chemical pump output, variation of water flow rate and the like.

The methods and system disclosed are also well suited for use in aquatic facilities where the level of knowledge of chlorine dioxide generating equipment (e.g. High School age Lifeguards) is limited.

DETAILED DESCRIPTION

The invention discloses a method for the autonomous generation of safe self-limiting concentrations of chlorine dioxide for the treatment of process water, the method comprising: a system comprising; a pressurized vessel containing a hydantoin based free halogen donor having a solubility between 0.075 to 0.30 wt % at 25° C., a source of water in fluid contact with the inlet to the pressurized vessel, a manifold in fluid contact with the outlet from the pressurized vessel for the introduction of at least a chlorite donor, a reaction chamber in fluid contact with the manifold and with the process water to be treated; wherein said source of water dissolves hydantoin based free halogen donor until 50 to 100% of saturation is achieved to form an aqueous solution of free halogen, chlorite donor is introduced to the aqueous solution of free halogen, chlorine dioxide is produced in the reaction chamber, and said chlorine dioxide in introduced to the process water.

In one embodiment, a source of acid is introduced into the manifold to lower the pH to accelerate the generation of chlorine dioxide.

Figure 1:
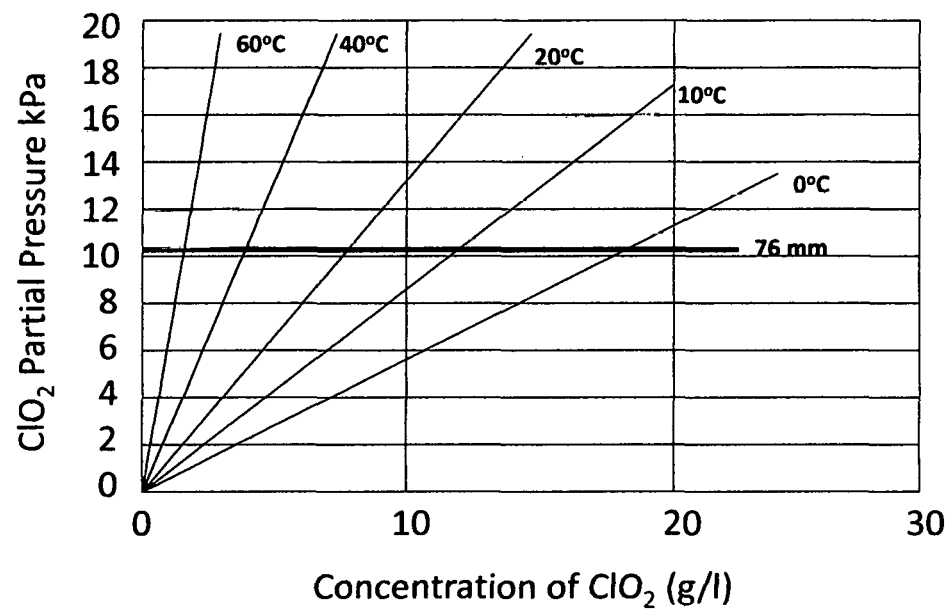
FIG. 1 illustrates the vapor pressure of chlorine dioxide for various concentrations and temperatures.
Figure 2:
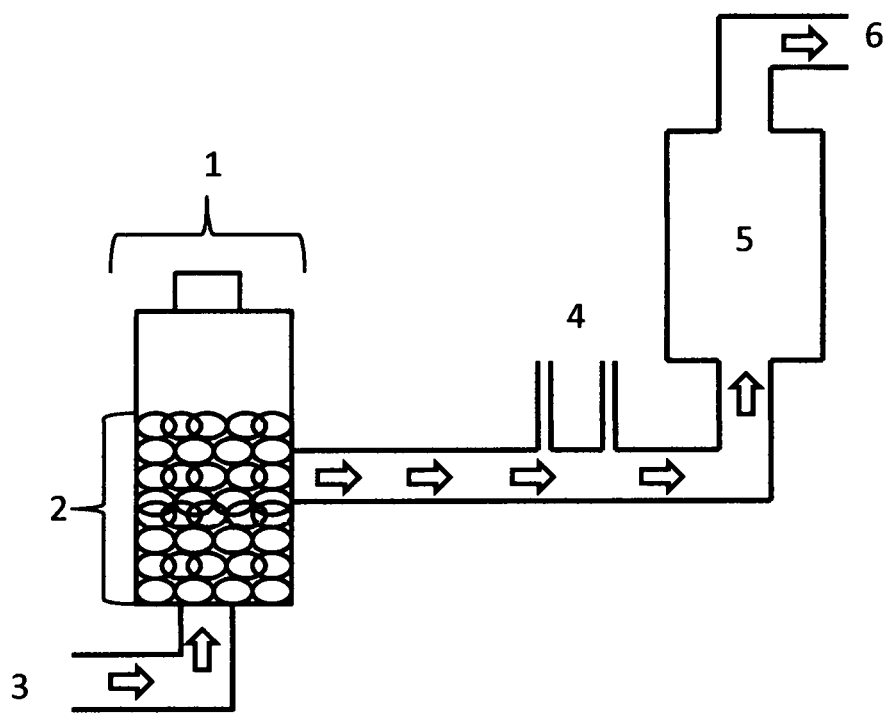
FIG. 2 illustrates the general design of the system for the safe self-limiting generation of chlorine dioxide. (1) illustrates the pressure vessel, (2) illustrates the hydantoin based free halogen donor, (3) illustrates a source of water in fluid contact with the pressure vessel, (4) illustrates a manifold in fluid contact with the outlet from the pressurized vessel for the introduction of at least a chlorite donor, (5) illustrates a reaction chamber in fluid contact with the manifold and in fluid contact with the process water to be treated with chlorine dioxide (6).

As used herein "autonomous" is a term used to describe the ability of the chlorine dioxide generating system to operate remotely free of frequent human interaction while ensuring the concentration of chlorine dioxide generated is at safe levels. An autonomous system can be started by human interaction or by detection of process flow or timer. However, once operating, the system can safely generate chlorine dioxide without additional human interaction other than replenishing chemicals and maintenance.

As used herein, "safe" and "safe levels" is used to describe the concentration of chlorine dioxide generated by the disclosed chlorine dioxide generating system cannot achieve a vapor pressure of chlorine dioxide that would induce deflagration or detonation under the conditions in which the chlorine dioxide is generated or applied. The safe level is considered to be a concentration that is less than or equal to about 3000 ppm as $ClO_2$.

As used herein, "self-limiting" is a term used to describe the limited concentration of chlorine dioxide that can be generated as a result of the limited solubility of the hydantoin based free halogen donor.

As used herein, "aqueous solution of free halogen donor" describes the aqueous solution discharged from the pressurized vessel containing a hydantoin based free halogen donor. The aqueous solution of free halogen donor comprises from 50 to 100 wt % of saturation of the hydantoin based free halogen donor for the given set of conditions exemplified by water flow-rate and water temperature.

As used herein, "50 to 100% of saturation" describes the percentage (%) of hydantoin based free halogen donor based on its maximum solubility (saturated solution). The percentage of saturation achieved depends on the flow-rate of water thru the pressurized vessel. With higher flow-rates of water thru the pressurized vessel there is reduced contact time and subsequently lower concentrations of hydantoin based free halogen donor in the aqueous solution.

As used herein, "process water" is the water that is to be treated with the chlorine dioxide. Non-limiting examples of process water include: water used for desalination of artificial lift pumps, hydraulic fracturing water, water used in drilling wells, water flooding, well stimulation, well remediation, aquatic facilities and the like.

As used herein, "aquatic facilities" include swimming pools, water parks, theme parks, and spas where bathers interact with the water.

As used herein, "reaction chamber" describes a chamber wherein the reactions between the free halogen and chlorite generate chlorine dioxide. Non-limiting examples of suitable chambers include pipe, hose, static mixer, a voluminous compartment (e.g. large diameter pipe) and the like.

As used herein, "manifold" describes a location in fluid contact with the aqueous solution of hydantoin based free halogen donor where the chlorite donor and optionally a source of acid are introduced to interact with the free halogen. For example the chlorite donor can be introduced with the conduit carrying the aqueous solution of free halogen donor with fitting exemplified by the non-limiting examples: PVC "tee", venture (e.g. mazzei), injection nozzle, injection quill and the like.

As used herein, "free halogen" describes the activator released by the hydantoin based free halogen donor that reacts with the chlorite ions to generate chlorine dioxide.

Examples of free halogen include bromine ($Br_2$), hypobromous acid (HOBr), chlorine ($Cl_2$) and hypochlorous acid (HOCl).

As used herein, "hydrocarbon recovery systems" includes the geologic formations, operations, and equipment used to access, acquire and recover hydrocarbons from hydrocarbon-bearing geologic formations. The hydrocarbon recovery system is selected from the group consisting of material that contains one or more solid, liquid, or gaseous hydrocarbons, a hydrocarbon deposit, a petroleum deposit, a hydrocarbon or petroleum product formation, a hydrocarbon or petroleum processing product or equipment, hydrocarbon recovery operations, or combinations thereof. As used herein, "hydrocarbon or petroleum processing product or equipment" is selected from the group consisting of one or more pieces of equipment for accessing, extracting, recovering, or processing hydrocarbons, a pipeline for transporting hydrocarbons and a vessel for storage of hydrocarbons.

As used herein, "hydrocarbon recovery applications" is selected from the group consisting of well drilling, hydraulic fracturing, water flooding, well stimulation, well remediation, pump desalination, and jet pump power fluid.

As used herein, "souring" describes the subterranean portion of a hydrocarbon recovery system that has been contaminated with sulfate reducing bacteria.

As used herein "sour" describes the subterranean portion of a hydrocarbon recovery system that has been contaminated with sulfate reducing bacteria, and where the recovered formation fluid does have detectable concentrations of hydrogen sulfide.

As used herein, "water" can be an aqueous solution comprising dissolved solids, dissolved gases and the like. The use of the term water is not meant to represent only the pure form of water having the general formula $H_2O$.

As used herein, "aqueous solution" comprises a predominance of water but may include other chemicals common to water exemplified by minerals, salts, gases as well as chemicals added to the water.

As used herein, "chlorite donor" describes any chemical compound that releases chlorite (having the general formula $ClO_2^-$) when dissolved in an aqueous solution. Non-limiting examples of sources of chlorite include: sodium chlorite, potassium chlorite and earth metal chlorites.

As used herein, "chlorite" describes the precursor for generating chlorine dioxide, and has the general formula $ClO_2^-$.

As used herein, "hydantoin based free halogen donor" comprises low solubility solid forms of free halogen donor comprising $Br^+$ and/or $Cl^+$ bonded to dialkylhydantoin where one of the alkyl groups comprises a methyl group and the other alkyl group comprises 1 to 4 carbons (preferably methyl group). The hydantoin based free halogen donor has solubility between 0.075 to 0.30 wt % at 25° C. Non-limiting examples of preferred hydantoin based free halogen donors include: 1,3-dibromo-5,5-dimethylhydantoin (DBDMH), 1,3-bromo-chloro-5,5-dimethylhydantoin (BCDMH), 1,3-dichloro-5,5-dimethylhydantoin (DCDMH), 1,3-dichloro-5-ethyl-5-methylhydantoin and mixtures thereof. The molar ratio of bromine to chlorine can vary in the BCDMH. The hydantoin based free halogen donor can be a blend or mixture of the low solubility solids as well. Hydantoin based free halogen donor can be in the form of powder, granules, nuggets, tablets or any convenient geometric configuration. The preferred form is in the form of granules, nuggets or tablets.

As used herein, "source of acid" is used to describe a hydrogen donor ($H^+$) that lowers the pH of the chlorine dioxide solution in the reaction chamber. This is usually a mineral acid exemplified by hydrochloric acid and sulfuric acid, but can also be an organic acid exemplified by acetic acid, citric acid and the like. Any hydrogen donor that is compatible with the free halogen concentration discharged from the pressure vessel is suitable. Especially true in the case of hydantoin based free halogen donors comprising bromine, the pH of the aqueous solution within the reactor needs can be adequately adjusted to catalyze the reaction using weak organic acids since hypobromous acid is prevalent at a much higher pH than hypochlorous acid or chlorine gas.

The invention provides for methods and a system that is self-limiting in the concentration of chlorine dioxide thereby providing for safe generation and application of chlorine dioxide to applications that are remote and/or have less operator oversight.

Many chlorine dioxide generators that use a chlorite donor to generate chlorine dioxide use either gas chlorine that is stored or generated using electrolysis on-site, sodium hypochlorite, or react the chlorite with concentrated hydrochloric acid, usually using an educator (vacuum) type system. Other systems such as that disclosed in co-pending U.S. application Ser. No. 14/121,322 disclose using sensors and computer controls employing algorithms to adjust and compensate the chlorine dioxide produced in the reactor to ensure the reactor/generator is flooded and a range of concentrations of chlorine dioxide can be produced using chemical pumps.

However, these types of systems are expensive and still require routine monitoring to ensure the system is operating correctly. Without the implementation of sensors and sophisticated computer algorithms and monitoring, simple variations in the process can lead to catastrophic events, leading to property damage, personal injury and even death.

For example, a chlorine dioxide generator producing 3000 mg/l of chlorine dioxide that experiences a reduction in water flow thru the generator will experience significant increases in chlorine dioxide concentrations unless the generator system automatically compensates for the reduced flow-rate of water. A reduction of water flow-rate from 5 gpm to 3 gpm increases the concentration of chlorine dioxide in the generator by 40%. Instead of generating a safe 3000 ppm of chlorine dioxide, the generator is producing 5000 ppm chlorine dioxide. Also variations in chemical feed-rate subsequently have the same effect. Variations in chemical pumping rate due to supply (head pressure) can significantly increase the feed-rate of chemicals and resulting concentration of chlorine dioxide. While more sophisticated chlorine dioxide generators incorporate sensors and design features to compensate for these factors, they are far too expensive and sophisticated for wide spread us to remote applications such as the treatment of water used for desalination in oil and gas recovery, or where inexperienced personnel utilize the equipment such as a lifeguard at an aquatic facility.

The method and system disclosed by the invention provides a cost effective and fool-proof system for generating a safe level of chlorine dioxide for wide spread use for applications that are remote and or will not require frequent operator interface.

The Following Describes the Principals of Operation

The vapor pressure of chlorine dioxide is dependent on the concentration of chlorine dioxide in solution and temperature. FIG. 1 illustrates the vapor pressure of chlorine dioxide (partial pressure) at various temperature and pressure. OSHA reports the desired partial pressure is not to exceed 76 mm Hg at atmospheric pressure.

During the generation and application of chlorine dioxide the pressure within the generating system will rise. Any chlorine dioxide vapor pockets exposed to this pressure will compress, increasing the risk of decomposition and potential detonation if the concentration of chlorine dioxide exceeds a safe level resulting in high partial pressure. To ensure safe levels of chlorine dioxide are not exceeded during autonomous operations where only periodic or unskilled operator interaction will occur, it is crucial to utilize a chlorine dioxide generating system that is fool-proof such that there is no possibility of producing concentrations of chlorine dioxide that exceeds the safe level. For short term storage within the reactor and vapor compression concerns, 3000 ppm of chlorine dioxide is the maximum concentration to ensure safe levels are not exceeded under conditions achieved during generation and application. Preferably the maximum concentration of chlorine dioxide is less than or equal to 2500 ppm, and most preferred less than or equal to 2000 ppm as $ClO_2$.

For continuous operations, it may be desirable to use 50-75% saturation at high throughput thereby allowing for higher solubility hydantoin based free halogen donors having solubility up to 0.6 wt % at 25° C. However the preferred method is to operate the system to achieve 90-100% of saturation with hydantoin based free halogen donors having solubility between 0.075 to 0.3 wt % at 25° C. to ensure the maximum generation of chlorine dioxide cannot exceed the safe level.

Molar Ratios Effect $Cl_2:ClO_2$

The hydantoin based free halogen donors suitable for use in the application have low solubility compared to traditional free halogen donors exemplified by gas chlorine, sodium hypochlorite, trichlorisocyanuric acid, dichloroisocyanurate, calcium hypochlorite and the like.

For example, BCDMH has a solubility reported at 0.2 wt % at 25° C. while DBDMH reports a solubility of 0.1 wt % at 20° C.

BCDMH provides approximately 60% as active free halogen reported as $Cl_2$. A saturated solution of BCDMH comprises 0.2 wt % as BCDMH at 25° C.

The general stoichiometry for generating chlorine dioxide from chlorite ions and free halogen reported as chlorine gas is as follows:

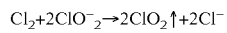

$$Cl_2 + 2ClO_2^- \rightarrow 2ClO_2\uparrow + 2Cl^-$$

Therefore, the concentration of chlorine dioxide that can be generated from a saturated solution of BCDMH is determined as follows:

2000 mg/l as BCDMH×0.6 (% as $Cl_2$)=1200 mg/l as $Cl_2$ 1200 mg/l÷71 (mw of $Cl_2$)=16.90 mMol/l $Cl_2$ 16.90 mMol/l $Cl_2$×2 (mol $ClO_2$/mol $Cl_2$)=33.8 mMol/l as $ClO_2\uparrow$ 33.8 mMol/l $ClO_2\uparrow$×67.5 (mw $ClO_2$)=2282 mg/l as $ClO_2\uparrow$ Use of the method and system for generating chlorine dioxide disclosed when using BCDMH, the maximum concentration of chlorine dioxide that can be produced is 2282 mg/l, well below the safe level of 3000 mg/l.

In the case of DBDMH, the saturation level of DBDMH at 20° C. is 0.1 wt % or 1000 mg/l as DBDMH. DBDMH free halogen activity is 111% as $Br_2$.

1000 mg/l DBDMH×1.11 (% as $Br_2$)=1110 mg/l as $Br_2$ 1110 mg/l as $Br_2$÷159.8 (mw $Br_2$)=6.95 mMol/l $Br_2$ 6.95 mMol/l $Br_2$×2 (mol $ClO_2$/mol $Br_2$)=13.9 mMol/l as $ClO_2\uparrow$ 13.9 mMol/l as $ClO_2\uparrow$×67.5 (mw $ClO_2\uparrow$)=938.25 mg/l as $ClO_2\uparrow$ Again, the maximum concentration of chlorine dioxide that can be generated using the method and system of the invention using DBDMH as the hydantoin based free halogen donor is 938.25 mg/l as $ClO_2$ gas.

An unobserved change in water flow rate thru the pressure vessel containing a hydantoin based free halogen donor will not change the maximum concentration of chlorine dioxide. The total mass of chlorine dioxide produced per unit time will change, however the maximum concentration report as ppm (mg/l) will not. The maximum concentration of chlorine dioxide that can be produced is limited as a result of the maximum concentration of hydantoin based free halogen donor in the effluent stream which is self-limiting based on solubility limitations.

Test Results 220.20 grams of water was treated with 0.18 grams of BCDMH and mixed until dissolved. Two 100 gram samples of solution comprising BCDMH were prepared. Sample 1 was treated with 0.60 grams of 25 wt % $NaClO_2$ and 100 µl of 30 wt % HCl to reduce the pH to approximately 2.5. The sample was mixed for approximately 60 seconds, and a sample was collected and tested using a HACH DR 2800 using the high range $ClO_2$. The result reported 808 ppm as $ClO_2$. Sample 2 was treated with 1.17 grams of 25 wt % $NaClO_2$ and 200 µl of 30 wt % HCl and mixed for approximately 60 seconds. The pH of this sample was approximately 2.3. The sample provided 804 ppm as $ClO_2$.

Discussion

Sample 1 had a molar ratio of approximately 2:1 as $ClO_2^-$ to $Cl_2$ respectively while sample 2 had a molar ratio of approximately 4:1 as $ClO_2^-$ to $Cl_2$ respectively as well as a slightly lower pH.

The test and results illustrate that the maximum concentration of chlorine dioxide generated was effectively limited based on the concentration of free halogen and the respectively molar ratio of 2:1 $ClO_2^-$ to $Cl_2$. Feeding more sodium chlorite did not provide for higher concentrations of chlorine dioxide even a slightly lower pH.

The data illustrates the theory behind the safe self-limiting generation of chlorine dioxide and the disclosed system used to generate the chlorine dioxide. Even in the case of unmanned operation, the maximum concentration of chlorine dioxide produced by the disclosed system is limited based on the maximum solubility of the low solubility hydantoin based free halogen donor. Excess feed rate of sodium chlorite will not increase the maximum concentration of chlorine dioxide exiting the generator. Even a reduction in water flow-rate thru the pressurized vessel will not increase the concentration of chlorine dioxide since the maximum concentration is limited based on the maximum solubility of hydantoin based free halogen donor. Only the mass flow-rate of chlorine dioxide produced can be altered, not the concentration of chlorine dioxide exiting the reactor.

Equipment

Non-limiting examples of pressurized vessels include: Neptune Chemical Pump Company, a division of R. A. Industries, Inc., Lansdale, Pa. 19446, as "Bromine Feeders"

Models BT-15, BT-40, BT-42, BT-80, BT-160, BT-270, and BT-350, or equivalent, and Hayward 100 and 200 series chlorinators and brominators, available from Hayward Pool Products, Inc., Elizabeth, N.J.

A flow meter may be used to preset a flow-rate, periodically monitor or automatically measure and verify the flow-rate through the generator. The verified flow-rate of water going into the pressure vessel can be used to optimize the chlorite donor feed rate and optionally acid feed-rate. One example of controlling the source of acid feed-rate is to slave an acid pump to the feed-rate of chlorite donor.

A flow switch can be used to interlock the chlorite and optional acid feed pumps to the system, thereby preventing feed of chlorite donor and source of acid during periods of no-flow conditions.

Check valves and/or a backflow preventer can be used to prevent chemically treated water from the reactor or within the manifold to flow back to the pressure vessel. The generator system can also be designed to implement inherent safety by ensuring the pressure vessel is always at higher pressure than the reactor and location of the fluid connection to the process water by elevating the pressure vessel. This ensures the pressure vessel flows downstream and helps prevent flow back to the pressure vessel.

Chemical pumps exemplified by the non-limiting examples including Liquid Metronic and Neptune can be used to feed the chlorite donor and optional source of acid. Such pumps can be equipped with anti-siphon valves and check valves. Another option is to incorporate venture systems exemplified by Mazzei venture injectors. Using a venture system, chemical is not fed unless water flow is sufficient to generate a vacuum causing education of the chemical into the water stream.

Timers and other auxiliary devices can be incorporated to delay or initiate operation of the chlorine dioxide generating system. For example, timers can be used to delay the feed of chlorite and acid source before engaging the chemical pumps. A pH sensor can be used to optimize the feed-rate of source of acid.

A computer can be incorporated to provide delayed activation of chemical pumps, on/off operations, flow-rate optimization of chlorite donor, as well as wireless or hardwired callout capability to notify personnel of maintenance needs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

I claim:

1. A method for the autonomous generation of safe self-limiting concentrations of chlorine dioxide for the treatment of process water, the method comprising:
in a system comprising:
a pressurized vessel containing a hydantoin based free halogen donor having a solubility between 0.075 to 0.30 wt % at 20° C., a source of water in fluid contact with the inlet to the pressurized vessel, a manifold in fluid contact with the outlet from the pressurized vessel, a manifold in fluid contact with the outlet from the pressurized vessel for introduction of at least a chlorite donor, a reaction chamber in fluid contact with the manifold and with the process water to be treated;
introducing said source water to dissolve hydantoin based free halogen donor until 50 to 100% of saturation is achieved to form an aqueous solution of free halogen, introducing chlorite donor to the manifold, producing chlorine dioxide in the reaction chamber, and said chlorine dioxide is introduced to the process water.

2. A method in accordance with claim 1, wherein safe self-limiting concentrations of chlorine dioxide is less than or equal to 3000 ppm as $ClO_2$.

3. A method in accordance with claim 2, wherein safe self-limiting concentrations of chlorine dioxide is less than or equal to 2500 ppm as $ClO_2$.

4. A method in accordance with claim 1, wherein the hydantoin based free halogen donor comprises 1,3-dibromo-5,5-dimethylhydantoin (DBDMH).

5. A method in accordance with claim 1, wherein the hydantoin based free halogen donor comprises 1,3-bromo-chloro-5,5-dimethylhydantoin (BCDMH).

6. A method in accordance with claim 1, wherein the hydantoin based free halogen donor comprises 1,3-dichloro-5,5-dimethylhydantoin (DCDMH).

7. A method in accordance with claim 1, wherein the hydantoin based free halogen donor is a mixture comprising at least one selected from: 1,3-dibromo-5,5-dimethylhydantoin (DBDMH), 1,3-bromo-chloro-5,5-dimethylhydantoin (BCDMH), 1,3-dichloro-5,5-dimethylhydantoin (DCDMH), and 1,3-dichloro-5-ethyl-5-methylhydantoin.

8. A method in accordance with claim 1, wherein the process water comprises an aquatic facility.

9. A method in accordance with claim 1, wherein the process water comprises water for the desalination of artificial lift pumps.

10. A method in accordance with claim 1, wherein the process water comprises water used for hydraulic fracturing.

11. A method in accordance with claim 1, wherein the process water comprises water used in drilling wells.

12. A method in accordance with claim 1, wherein the process water comprises water used in water flooding.

13. A method in accordance with claim 1, wherein the process water comprises water used in well stimulation.

14. A method in accordance with claim 1, wherein the process water comprises water used in well remediation.

15. A method in accordance with claim 1, further comprising adding acid to the manifold.

* * * * *